(12) United States Patent
Russell, III et al.

(10) Patent No.: US 8,112,565 B2
(45) Date of Patent: Feb. 7, 2012

(54) MULTI-PROTOCOL FIELD DEVICE INTERFACE WITH AUTOMATIC BUS DETECTION

(75) Inventors: Alden C. Russell, III, Minnetonka, MN (US); Stuart A. Harris, Minnetonka, MN (US); Marcos Peluso, Chanhassen, MN (US); Dale W. Borgeson, Minnealolis, MN (US)

(73) Assignee: Fisher-Rosemount Systems, Inc., Austin, TX (US)

( * ) Notice: Subject to any disclaimer, the term of this patent is extended or adjusted under 35 U.S.C. 154(b) by 292 days.

(21) Appl. No.: 11/448,164

(22) Filed: Jun. 6, 2006

(65) Prior Publication Data

US 2006/0282580 A1    Dec. 14, 2006

Related U.S. Application Data

(60) Provisional application No. 60/688,657, filed on Jun. 8, 2005.

(51) Int. Cl.
*G06F 13/12* (2006.01)
*G06F 13/38* (2006.01)

(52) U.S. Cl. ........................................................ 710/62

(58) Field of Classification Search .................. None
See application file for complete search history.

(56) References Cited

U.S. PATENT DOCUMENTS

| | | | |
|---|---|---|---|
| 3,096,434 A | 7/1963 | King | 235/151 |
| 3,404,264 A | 10/1968 | Kugler | 235/194 |
| 3,468,164 A | 9/1969 | Sutherland | 73/343 |
| 3,590,370 A | 6/1971 | Fleischer | 324/51 |
| 3,618,592 A | 11/1971 | Stewart | 128/2.05 R |
| 3,688,190 A | 8/1972 | Blum | 324/61 R |
| 3,691,842 A | 9/1972 | Akeley | 73/398 C |
| 3,701,280 A | 10/1972 | Stroman | 73/194 |
| 3,849,637 A | 11/1974 | Caruso et al. | 235/151 |
| 3,855,858 A | 12/1974 | Cushing | 73/194 EM |
| 3,948,098 A | 4/1976 | Richardson et al. | 73/861.24 |
| 3,952,759 A | 4/1976 | Ottenstein | 137/12 |
| 3,973,184 A | 8/1976 | Raber | 324/51 |
| RE29,383 E | 9/1977 | Gallatin et al. | 137/14 |

(Continued)

FOREIGN PATENT DOCUMENTS

CA          999950         11/1976

(Continued)

OTHER PUBLICATIONS

First Communication of European Patent Application No. 06 772 452.6, filed Jun. 7, 2006.

(Continued)

*Primary Examiner* — Tariq Hafiz
*Assistant Examiner* — Aurangzeb Hassan
(74) *Attorney, Agent, or Firm* — Christopher R. Christenson; Westman, Champlin & Kelly, P.A.

(57) ABSTRACT

A multi-protocol interface for coupling a field device to a general purpose computer is disclosed. The interface includes measurement circuitry to perform a plurality of measurements on a connected process communication loop to determine a process communication loop type. Then, if the interface includes a protocol interface module that matches the detected loop type, the protocol interface module can be engaged. A method for coupling a field device to a general purpose computer is also provided. In one aspect, power from the general purpose computer is used to power the process communication loop, if the interface determines that the loop is not powered.

7 Claims, 4 Drawing Sheets

U.S. PATENT DOCUMENTS

| | | | |
|---|---|---|---|
| 4,058,975 A | 11/1977 | Gilbert et al. | 60/39.28 |
| 4,083,031 A | 4/1978 | Pharo, Jr. | 367/135 |
| 4,099,413 A | 7/1978 | Ohte et al. | 73/359 |
| 4,102,199 A | 7/1978 | Talpouras | 73/362 |
| 4,122,719 A | 10/1978 | Carlson et al. | 73/342 |
| 4,249,164 A | 2/1981 | Tivy | 340/870.3 |
| 4,250,490 A | 2/1981 | Dahlke | 340/870.37 |
| 4,255,964 A | 3/1981 | Morison | 73/24.01 |
| 4,279,013 A | 7/1981 | Cameron et al. | 340/870.37 |
| 4,337,516 A | 6/1982 | Murphy et al. | 364/551 |
| 4,383,443 A | 5/1983 | Langdon | 73/290 |
| 4,399,824 A | 8/1983 | Davidson | 128/736 |
| 4,417,312 A | 11/1983 | Cronin et al. | 364/510 |
| 4,423,634 A | 1/1984 | Audenard et al. | 73/587 |
| 4,459,858 A | 7/1984 | Marsh | 73/861.12 |
| 4,463,612 A | 8/1984 | Thompson | 73/861.22 |
| 4,517,468 A | 5/1985 | Kemper et al. | 290/52 |
| 4,528,869 A | 7/1985 | Kubo et al. | 74/695 |
| 4,530,234 A | 7/1985 | Cullick et al. | 73/53 |
| 4,536,753 A | 8/1985 | Parker | 340/566 |
| 4,540,468 A | 9/1985 | Genco et al. | 162/49 |
| 4,571,689 A | 2/1986 | Hildebrand et al. | 364/481 |
| 4,630,265 A | 12/1986 | Sexton | 370/85 |
| 4,635,214 A | 1/1987 | Kasai et al. | 364/551 |
| 4,642,782 A | 2/1987 | Kemper et al. | 364/550 |
| 4,644,479 A | 2/1987 | Kemper et al. | 364/550 |
| 4,649,515 A | 3/1987 | Thompson et al. | 364/900 |
| 4,668,473 A | 5/1987 | Agarwal | 422/62 |
| 4,686,638 A | 8/1987 | Furuse | 364/558 |
| 4,696,191 A | 9/1987 | Claytor et al. | 73/600 |
| 4,707,796 A | 11/1987 | Calabro et al. | 364/552 |
| 4,720,806 A | 1/1988 | Schippers et al. | 364/551 |
| 4,736,367 A | 4/1988 | Wroblewski et al. | 370/85 |
| 4,736,763 A | 4/1988 | Britton et al. | 137/10 |
| 4,758,308 A | 7/1988 | Carr | 162/263 |
| 4,777,585 A | 10/1988 | Kokawa et al. | 364/164 |
| 4,807,151 A | 2/1989 | Citron | 364/510 |
| 4,818,994 A | 4/1989 | Orth et al. | 340/501 |
| 4,831,564 A | 5/1989 | Suga | 364/551.01 |
| 4,841,286 A | 6/1989 | Kummer | 340/653 |
| 4,853,693 A | 8/1989 | Eaton-Williams | 340/588 |
| 4,873,655 A | 10/1989 | Kondraske | 364/553 |
| 4,907,167 A | 3/1990 | Skeirik | 364/500 |
| 4,924,418 A | 5/1990 | Backman et al. | 364/550 |
| 4,926,364 A | 5/1990 | Brotherton | 364/581 |
| 4,934,196 A | 6/1990 | Romano | 73/861.38 |
| 4,939,753 A | 7/1990 | Olson | 375/107 |
| 4,964,125 A | 10/1990 | Kim | 371/15.1 |
| 4,988,990 A | 1/1991 | Warrior | 340/25.5 |
| 4,992,965 A | 2/1991 | Holter et al. | 364/551.01 |
| 5,005,142 A | 4/1991 | Lipchak et al. | 364/550 |
| 5,019,760 A | 5/1991 | Chu et al. | 318/490 |
| 5,025,344 A | 6/1991 | Maly et al. | 361/88 |
| 5,043,862 A | 8/1991 | Takahashi et al. | 364/162 |
| 5,047,990 A | 9/1991 | Gafos et al. | 367/6 |
| 5,053,815 A | 10/1991 | Wendell | 355/208 |
| 5,057,774 A | 10/1991 | Verhelst et al. | 324/537 |
| 5,067,099 A | 11/1991 | McCown et al. | 364/550 |
| 5,081,598 A | 1/1992 | Bellows et al. | 364/550 |
| 5,089,979 A | 2/1992 | McEachern et al. | 364/571.04 |
| 5,089,984 A | 2/1992 | Struger et al. | 395/650 |
| 5,098,197 A | 3/1992 | Shepard et al. | 374/120 |
| 5,099,436 A | 3/1992 | McCown et al. | 364/550 |
| 5,103,409 A | 4/1992 | Shimizu et al. | 364/556 |
| 5,111,531 A | 5/1992 | Grayson et al. | 395/23 |
| 5,121,467 A | 6/1992 | Skeirik | 395/11 |
| 5,122,794 A | 6/1992 | Warrior | 340/825.2 |
| 5,122,976 A | 6/1992 | Bellows et al. | 364/550 |
| 5,130,936 A | 7/1992 | Sheppard et al. | 364/551.01 |
| 5,134,574 A | 7/1992 | Beaverstock et al. | 364/551.01 |
| 5,137,370 A | 8/1992 | McCullock et al. | 374/173 |
| 5,142,612 A | 8/1992 | Skeirik | 395/11 |
| 5,143,452 A | 9/1992 | Maxedon et al. | 374/170 |
| 5,148,378 A | 9/1992 | Shibayama et al. | 364/551.07 |
| 5,150,289 A | 9/1992 | Badavas | 364/154 |
| 5,167,009 A | 11/1992 | Skeirik | 395/27 |
| 5,175,678 A | 12/1992 | Frerichs et al. | 364/148 |
| 5,193,143 A | 3/1993 | Kaemmerer et al. | 395/51 |
| 5,197,114 A | 3/1993 | Skeirik | 395/22 |
| 5,197,328 A | 3/1993 | Fitzgerald | 73/168 |
| 5,212,765 A | 5/1993 | Skeirik | 395/11 |
| 5,214,582 A | 5/1993 | Gray | 364/424.03 |
| 5,216,226 A | 6/1993 | Miyoshi | 219/497 |
| 5,224,203 A | 6/1993 | Skeirik | 395/22 |
| 5,228,780 A | 7/1993 | Shepard et al. | 374/175 |
| 5,235,527 A | 8/1993 | Ogawa et al. | 364/571.05 |
| 5,265,031 A | 11/1993 | Malczewski | 364/497 |
| 5,265,222 A | 11/1993 | Nishiya et al. | 395/3 |
| 5,269,311 A | 12/1993 | Kirchner et al. | 128/672 |
| 5,274,572 A | 12/1993 | O'Neill et al. | 364/550 |
| 5,282,131 A | 1/1994 | Rudd et al. | 364/164 |
| 5,282,261 A | 1/1994 | Skeirik | 395/22 |
| 5,293,585 A | 3/1994 | Morita | 395/52 |
| 5,303,181 A | 4/1994 | Stockton | 365/96 |
| 5,305,230 A | 4/1994 | Matsumoto et al. | 364/495 |
| 5,311,421 A | 5/1994 | Nomura et al. | 364/157 |
| 5,317,520 A | 5/1994 | Castle | 364/482 |
| 5,327,357 A | 7/1994 | Feinstein et al. | 364/502 |
| 5,333,240 A | 7/1994 | Matsumoto et al. | 395/23 |
| 5,340,271 A | 8/1994 | Freeman et al. | 415/1 |
| 5,347,843 A | 9/1994 | Orr et al. | 73/3 |
| 5,349,541 A | 9/1994 | Alexandro, Jr. et al. | 364/578 |
| 5,357,449 A | 10/1994 | Oh | 364/551.01 |
| 5,361,628 A | 11/1994 | Marko et al. | 73/116 |
| 5,365,423 A | 11/1994 | Chand | 364/140 |
| 5,365,787 A | 11/1994 | Hernandez et al. | 73/660 |
| 5,367,612 A | 11/1994 | Bozich et al. | 395/22 |
| 5,369,674 A | 11/1994 | Yokose et al. | 376/245 |
| 5,384,699 A | 1/1995 | Levy et al. | 364/413.13 |
| 5,386,373 A | 1/1995 | Keeler et al. | 364/577 |
| 5,388,465 A | 2/1995 | Okaniwa et al. | 73/861.17 |
| 5,392,293 A | 2/1995 | Hsue | 324/765 |
| 5,394,341 A | 2/1995 | Kepner | 364/551.01 |
| 5,394,543 A | 2/1995 | Hill et al. | 395/575 |
| 5,404,064 A | 4/1995 | Mermelstein et al. | 310/319 |
| 5,408,406 A | 4/1995 | Mathur et al. | 364/163 |
| 5,408,586 A | 4/1995 | Skeirik | 395/23 |
| 5,410,495 A | 4/1995 | Ramamurthi | 364/511.05 |
| 5,414,645 A | 5/1995 | Hirano | 364/551.01 |
| 5,419,197 A | 5/1995 | Ogi et al. | 73/659 |
| 5,430,642 A | 7/1995 | Nakajima et al. | 364/148 |
| 5,434,774 A | 7/1995 | Seberger | 364/172 |
| 5,436,705 A | 7/1995 | Raj | 355/246 |
| 5,440,478 A | 8/1995 | Fisher et al. | 364/188 |
| 5,442,639 A | 8/1995 | Crowder et al. | 371/20.1 |
| 5,467,355 A | 11/1995 | Umeda et al. | 364/571.04 |
| 5,469,070 A | 11/1995 | Koluvek | 324/713 |
| 5,469,156 A | 11/1995 | Kogure | 340/870.38 |
| 5,469,735 A | 11/1995 | Watanabe | 73/118.1 |
| 5,469,749 A | 11/1995 | Shimada et al. | 73/861.47 |
| 5,481,199 A | 1/1996 | Anderson et al. | 324/705 |
| 5,481,200 A | 1/1996 | Voegele et al. | 324/718 |
| 5,483,387 A | 1/1996 | Bauhahn et al. | 359/885 |
| 5,485,753 A | 1/1996 | Burns et al. | 73/720 |
| 5,486,996 A | 1/1996 | Samad et al. | 364/152 |
| 5,488,697 A | 1/1996 | Kaemmerer et al. | 395/51 |
| 5,489,831 A | 2/1996 | Harris | 318/701 |
| 5,495,769 A | 3/1996 | Broden et al. | 73/718 |
| 5,510,779 A | 4/1996 | Maltby et al. | 340/870.3 |
| 5,511,004 A | 4/1996 | Dubost et al. | 364/551.01 |
| 5,526,293 A | 6/1996 | Mozumder et al. | 364/578 |
| 5,539,638 A | 7/1996 | Keeler et al. | 364/424.03 |
| 5,548,528 A | 8/1996 | Keeler et al. | 364/497 |
| 5,555,190 A | 9/1996 | Derby et al. | 364/510 |
| 5,560,246 A | 10/1996 | Bottinger et al. | 73/861.15 |
| 5,561,599 A | 10/1996 | Lu | 364/164 |
| 5,570,034 A | 10/1996 | Needham et al. | 324/763 |
| 5,570,300 A | 10/1996 | Henry et al. | 364/551.01 |
| 5,572,420 A | 11/1996 | Lu | 364/153 |
| 5,573,032 A | 11/1996 | Lenz et al. | 137/486 |
| 5,578,763 A | 11/1996 | Spencer et al. | 73/861.08 |
| 5,591,922 A | 1/1997 | Segeral et al. | 73/861.04 |
| 5,598,521 A | 1/1997 | Kilgore et al. | 395/326 |
| 5,600,148 A | 2/1997 | Cole et al. | 250/495.1 |
| 5,608,650 A | 3/1997 | McClendon et al. | 364/510 |
| 5,623,605 A | 4/1997 | Keshav et al. | 395/200.17 |
| 5,629,870 A | 5/1997 | Farag et al. | 364/551.01 |

| Patent No. | Kind | Date | Inventor | Class |
|---|---|---|---|---|
| 5,633,809 | A | 5/1997 | Wissenbach et al. | 364/510 |
| 5,637,802 | A | 6/1997 | Frick et al. | 73/724 |
| 5,640,491 | A | 6/1997 | Bhat et al. | 395/22 |
| 5,644,240 | A | 7/1997 | Brugger | 324/439 |
| 5,654,869 | A | 8/1997 | Ohi et al. | 361/540 |
| 5,661,668 | A | 8/1997 | Yemini et al. | 364/550 |
| 5,665,899 | A | 9/1997 | Willcox | 73/1.63 |
| 5,669,713 | A | 9/1997 | Schwartz et al. | 374/1 |
| 5,671,335 | A | 9/1997 | Davis et al. | 395/23 |
| 5,671,355 | A | 9/1997 | Collins | 395/200.2 |
| 5,672,247 | A | 9/1997 | Pangalos et al. | 162/65 |
| 5,675,504 | A | 10/1997 | Serodes et al. | 364/496 |
| 5,675,724 | A | 10/1997 | Beal et al. | 395/182.02 |
| 5,680,109 | A | 10/1997 | Lowe et al. | 340/608 |
| 5,682,317 | A | 10/1997 | Keeler et al. | 364/431.03 |
| 5,682,476 | A | 10/1997 | Tapperson et al. | 370/225 |
| 5,700,090 | A | 12/1997 | Eryurek | 374/210 |
| 5,703,575 | A | 12/1997 | Kirkpatrick | 340/870.17 |
| 5,704,011 | A | 12/1997 | Hansen et al. | 395/22 |
| 5,705,754 | A | 1/1998 | Keita et al. | 73/861.357 |
| 5,705,978 | A | 1/1998 | Frick et al. | 340/511 |
| 5,708,211 | A | 1/1998 | Jepson et al. | 73/861.04 |
| 5,708,585 | A | 1/1998 | Kushion | 364/431.061 |
| 5,710,370 | A | 1/1998 | Shanahan et al. | 73/1.35 |
| 5,710,708 | A | 1/1998 | Wiegland | 364/470.1 |
| 5,713,668 | A | 2/1998 | Lunghofer et al. | 374/179 |
| 5,719,378 | A | 2/1998 | Jackson, Jr. et al. | 219/497 |
| 5,731,522 | A | 3/1998 | Sittler | 73/708 |
| 5,736,649 | A | 4/1998 | Kawasaki et al. | 73/861.23 |
| 5,741,074 | A | 4/1998 | Wang et al. | 374/185 |
| 5,742,845 | A | 4/1998 | Wagner | 395/831 |
| 5,746,511 | A | 5/1998 | Eryurek et al. | 374/2 |
| 5,747,701 | A | 5/1998 | Marsh et al. | 73/861.23 |
| 5,752,008 | A | 5/1998 | Bowling | 395/500 |
| 5,764,539 | A | 6/1998 | Rani | 364/557 |
| 5,764,891 | A | 6/1998 | Warrior | 395/200.2 |
| 5,781,024 | A | 7/1998 | Blomberg et al. | 324/763 |
| 5,781,878 | A | 7/1998 | Mizoguchi et al. | 701/109 |
| 5,790,413 | A | 8/1998 | Bartusiak et al. | 364/485 |
| 5,796,006 | A | 8/1998 | Bellet et al. | 73/661 |
| 5,801,689 | A | 9/1998 | Huntsman | 345/329 |
| 5,805,442 | A | 9/1998 | Crater et al. | 364/138 |
| 5,817,950 | A | 10/1998 | Wiklund et al. | 73/861.66 |
| 5,825,664 | A | 10/1998 | Warrior et al. | 700/7 |
| 5,828,567 | A | 10/1998 | Eryurek et al. | 700/79 |
| 5,829,876 | A | 11/1998 | Schwartz et al. | 374/1 |
| 5,848,383 | A | 12/1998 | Yuuns | 702/102 |
| 5,854,993 | A | 12/1998 | Crichnik | 702/54 |
| 5,854,994 | A | 12/1998 | Canada et al. | 702/56 |
| 5,859,964 | A | 1/1999 | Wang et al. | 395/185.01 |
| 5,869,772 | A | 2/1999 | Storer | 73/861.24 |
| 5,876,122 | A | 3/1999 | Eryurek | 374/183 |
| 5,880,376 | A | 3/1999 | Sai et al. | 73/861.08 |
| 5,887,978 | A | 3/1999 | Lunghofer et al. | 374/179 |
| 5,908,990 | A | 6/1999 | Cummings | 73/861.22 |
| 5,923,557 | A | 7/1999 | Eidson | 364/471.03 |
| 5,924,086 | A | 7/1999 | Mathur et al. | 706/25 |
| 5,926,778 | A | 7/1999 | Pöppel | 702/130 |
| 5,934,371 | A | 8/1999 | Bussear et al. | 166/53 |
| 5,936,514 | A | 8/1999 | Anderson et al. | 340/310.01 |
| 5,938,754 | A * | 8/1999 | Edwards et al. | 710/305 |
| 5,940,290 | A | 8/1999 | Dixon | 364/138 |
| 5,956,663 | A | 9/1999 | Eryurek et al. | 702/183 |
| 5,970,430 | A | 10/1999 | Burns et al. | 702/122 |
| 5,995,910 | A | 11/1999 | Discenzo | 702/56 |
| 6,002,952 | A | 12/1999 | Diab et al. | 600/310 |
| 6,006,338 | A | 12/1999 | Longsdorf et al. | 713/340 |
| 6,014,612 | A | 1/2000 | Larson et al. | 702/183 |
| 6,014,902 | A | 1/2000 | Lewis et al. | 73/861.12 |
| 6,016,523 | A | 1/2000 | Zimmerman et al. | 710/63 |
| 6,016,706 | A | 1/2000 | Yamamoto et al. | 9/6 |
| 6,017,143 | A | 1/2000 | Eryurek et al. | 700/51 |
| 6,023,399 | A | 2/2000 | Kogure | 361/23 |
| 6,026,352 | A | 2/2000 | Burns et al. | 702/182 |
| 6,038,579 | A | 3/2000 | Sekine | 708/400 |
| 6,045,260 | A | 4/2000 | Schwartz et al. | 374/183 |
| 6,046,642 | A | 4/2000 | Brayton et al. | 330/296 |
| 6,047,220 | A | 4/2000 | Eryurek et al. | 700/28 |
| 6,047,222 | A | 4/2000 | Burns et al. | 700/79 |
| 6,052,655 | A | 4/2000 | Kobayashi et al. | 702/184 |
| 6,061,603 | A | 5/2000 | Papadopoulos et al. | 700/83 |
| 6,072,150 | A | 6/2000 | Sheffer | 219/121.83 |
| 6,094,600 | A | 7/2000 | Sharpe, Jr. et al. | 700/19 |
| 6,112,131 | A | 8/2000 | Ghorashi et al. | 700/142 |
| 6,119,047 | A | 9/2000 | Eryurek et al. | 700/28 |
| 6,119,529 | A | 9/2000 | Di Marco et al. | 73/861.68 |
| 6,139,180 | A | 10/2000 | Usher et al. | 374/1 |
| 6,151,560 | A | 11/2000 | Jones | 702/58 |
| 6,179,964 | B1 | 1/2001 | Begemann et al. | 162/198 |
| 6,182,501 | B1 | 2/2001 | Furuse et al. | 73/49.2 |
| 6,192,281 | B1 | 2/2001 | Brown et al. | 700/2 |
| 6,195,591 | B1 | 2/2001 | Nixon et al. | 700/2 |
| 6,199,018 | B1 | 3/2001 | Quist et al. | 702/34 |
| 6,209,048 | B1 | 3/2001 | Wolff | 710/62 |
| 6,211,649 | B1 | 4/2001 | Matsuda | 320/115 |
| 6,236,948 | B1 | 5/2001 | Eck et al. | 702/45 |
| 6,237,424 | B1 | 5/2001 | Salmasi et al. | 73/861.17 |
| 6,260,004 | B1 | 7/2001 | Hays et al. | 702/183 |
| 6,263,487 | B1 | 7/2001 | Stripf et al. | 717/1 |
| 6,272,438 | B1 | 8/2001 | Cunningham et al. | 702/56 |
| 6,289,735 | B1 | 9/2001 | Dister et al. | 73/579 |
| 6,298,377 | B1 | 10/2001 | Hartikainen et al. | 709/223 |
| 6,307,483 | B1 | 10/2001 | Westfield et al. | 340/870.11 |
| 6,311,136 | B1 | 10/2001 | Henry et al. | 702/45 |
| 6,317,701 | B1 | 11/2001 | Pyostsia et al. | 702/188 |
| 6,327,914 | B1 | 12/2001 | Dutton | 73/861.356 |
| 6,347,252 | B1 | 2/2002 | Behr et al. | 700/2 |
| 6,356,191 | B1 | 3/2002 | Kirkpatrick et al. | 340/501 |
| 6,360,277 | B1 | 3/2002 | Ruckley et al. | 9/250 |
| 6,370,448 | B1 | 4/2002 | Eryurek et al. | 700/282 |
| 6,377,859 | B1 | 4/2002 | Brown et al. | 700/79 |
| 6,378,364 | B1 | 4/2002 | Pelletier et al. | 73/152.47 |
| 6,396,426 | B1 | 5/2002 | Balard et al. | 341/120 |
| 6,397,114 | B1 | 5/2002 | Eryurek et al. | 700/51 |
| 6,404,393 | B1 | 6/2002 | Nelson et al. | 343/702 |
| 6,405,099 | B1 | 6/2002 | Nagai et al. | 700/159 |
| 6,425,038 | B1 | 7/2002 | Sprecher | 710/269 |
| 6,434,504 | B1 | 8/2002 | Eryurek et al. | 702/130 |
| 6,449,574 | B1 | 9/2002 | Eryurek et al. | 702/99 |
| 6,473,656 | B1 | 10/2002 | Langels et al. | 700/17 |
| 6,473,710 | B1 | 10/2002 | Eryurek | 702/133 |
| 6,480,793 | B1 | 11/2002 | Martin | 702/45 |
| 6,492,921 | B1 | 12/2002 | Kunitani et al. | 341/118 |
| 6,493,689 | B2 | 12/2002 | Kotoulas et al. | 706/23 |
| 6,497,222 | B2 | 12/2002 | Bolz et al. | 123/476 |
| 6,505,517 | B1 | 1/2003 | Eryurek et al. | 73/861.08 |
| 6,519,546 | B1 | 2/2003 | Eryurek et al. | 702/130 |
| 6,532,392 | B1 | 3/2003 | Eryurek et al. | 700/54 |
| 6,539,267 | B1 | 3/2003 | Eryurek et al. | 700/51 |
| 6,546,814 | B1 | 4/2003 | Choe et al. | 73/862.08 |
| 6,556,145 | B1 | 4/2003 | Kirkpatrick et al. | 340/870.17 |
| 6,567,006 | B1 | 5/2003 | Lander et al. | 340/605 |
| 6,594,603 | B1 | 7/2003 | Eryurek et al. | 702/104 |
| 6,597,997 | B2 | 7/2003 | Tingley | 702/34 |
| 6,601,005 | B1 | 7/2003 | Eryurek et al. | 702/104 |
| 6,601,124 | B1 | 7/2003 | Blair | 710/305 |
| 6,611,775 | B1 | 8/2003 | Coursolle et al. | 702/65 |
| 6,615,149 | B1 | 9/2003 | Wehrs | 702/76 |
| 6,654,697 | B1 | 11/2003 | Eryurek et al. | 702/47 |
| 6,701,274 | B1 | 3/2004 | Eryurek et al. | 702/140 |
| 6,727,812 | B1 | 4/2004 | Sauler et al. | 340/511 |
| 6,751,560 | B1 | 6/2004 | Tingley et al. | 702/51 |
| 6,754,601 | B1 | 6/2004 | Eryurek et al. | 702/104 |
| 6,758,168 | B2 | 7/2004 | Koskinen et al. | 122/7 |
| 6,859,755 | B2 | 2/2005 | Eryurek et al. | 702/183 |
| 6,904,476 | B2 | 6/2005 | Hedtke | 710/72 |
| 6,907,383 | B2 | 6/2005 | Eryurek et al. | 702/183 |
| 6,915,364 | B1 | 7/2005 | Christensen et al. | 710/104 |
| 6,970,003 | B2 | 11/2005 | Rome et al. | 324/718 |
| 7,018,800 | B2 | 3/2006 | Huisenga et al. | 435/6 |
| 7,040,179 | B2 | 5/2006 | Drahm et al. | 73/861.356 |
| 7,058,542 | B2 | 6/2006 | Hauhia et al. | 702/183 |
| 7,085,610 | B2 | 8/2006 | Eryurek et al. | 700/29 |
| 7,099,852 | B2 | 8/2006 | Unsworth et al. | 706/23 |
| 7,117,122 | B2 | 10/2006 | Zielinski et al. | 702/183 |
| 7,171,281 | B2 | 1/2007 | Weber et al. | 700/96 |
| 7,254,518 | B2 | 8/2007 | Eryurek et al. | 702/183 |
| 7,421,531 | B2 | 9/2008 | Rotvold et al. | 710/305 |

|   |   |   |   |
|---|---|---|---|
| 7,480,487 B2 * | 1/2009 | Smart et al. ............... 455/69 |
| 2002/0013629 A1 | 1/2002 | Nixon et al. |
| 2002/0032544 A1 | 3/2002 | Reid et al. ............... 702/183 |
| 2002/0077711 A1 | 6/2002 | Nixon ............... 700/19 |
| 2002/0121910 A1 | 9/2002 | Rome et al. ............... 324/718 |
| 2002/0145568 A1 | 10/2002 | Winter ............... 343/701 |
| 2002/0148644 A1 | 10/2002 | Schultz et al. ............... 175/39 |
| 2002/0167904 A1 * | 11/2002 | Borgeson et al. ............... 370/241 |
| 2002/0169582 A1 | 11/2002 | Eryurek et al. ............... 702/183 |
| 2002/0194547 A1 | 12/2002 | Christenson et al. ............... 714/43 |
| 2003/0033040 A1 | 2/2003 | Billings ............... 700/97 |
| 2003/0045962 A1 | 3/2003 | Eryurek et al. ............... 700/128 |
| 2003/0236937 A1 * | 12/2003 | Barros De Almeida et al. ............... 710/305 |
| 2004/0012264 A1 | 1/2004 | Burger et al. ............... 307/64 |
| 2004/0111238 A1 | 6/2004 | Kantzes et al. ............... 702/183 |
| 2004/0128034 A1 | 7/2004 | Lenker et al. ............... 700/282 |
| 2004/0199361 A1 | 10/2004 | Lu et al. ............... 702/183 |
| 2004/0203434 A1 | 10/2004 | Karschnia et al. ............... 455/67.11 |
| 2004/0228184 A1 | 11/2004 | Mathiowetz ............... 365/202 |
| 2004/0230327 A1 | 11/2004 | Opheim et al. ............... 700/83 |
| 2004/0249583 A1 | 12/2004 | Eryurek et al. ............... 702/47 |
| 2005/0072239 A1 | 4/2005 | Longsdorf et al. ............... 73/649 |
| 2005/0225923 A1 | 10/2005 | Howald ............... 361/234 |
| 2006/0075009 A1 | 4/2006 | Lenz et al. ............... 708/160 |
| 2006/0080631 A1 * | 4/2006 | Koo ............... 716/17 |
| 2006/0161359 A1 | 7/2006 | Lalla ............... 702/65 |
| 2006/0244424 A1 | 11/2006 | Nelson ............... 322/37 |
| 2006/0277000 A1 | 12/2006 | Wehrs ............... 702/183 |
| 2006/0291438 A1 | 12/2006 | Karschnia et al. ............... 370/338 |
| 2007/0010968 A1 | 1/2007 | Longsdorf et al. ............... 702/183 |
| 2008/0114911 A1 | 5/2008 | Schumacher ............... 710/72 |

FOREIGN PATENT DOCUMENTS

| | | |
|---|---|---|
| CN | 1185841 | 6/1998 |
| DE | 32 13 866 A1 | 10/1983 |
| DE | 35 40 204 C1 | 9/1986 |
| DE | 40 08 560 A1 | 9/1990 |
| DE | 43 43 747 | 6/1994 |
| DE | 44 33 593 A1 | 6/1995 |
| DE | 195 02 499 A1 | 8/1996 |
| DE | 296 00 609 U1 | 3/1997 |
| DE | 197 04 694 A1 | 8/1997 |
| DE | 19930660 A1 | 7/1999 |
| DE | 199 05 071 | 8/2000 |
| DE | 19905071 A1 | 8/2000 |
| DE | 299 17 651 U1 | 12/2000 |
| DE | 199 47 129 | 4/2001 |
| DE | 100 36 971 A1 | 2/2002 |
| DE | 102 23 725 A1 | 4/2003 |
| EP | 0 807 804 A2 | 19/1997 |
| EP | 0 122 622 A1 | 10/1984 |
| EP | 0 413 814 A1 | 2/1991 |
| EP | 0 487 419 A2 | 5/1992 |
| EP | 0 512 794 A2 | 11/1992 |
| EP | 0 594 227 A1 | 4/1994 |
| EP | 0 624 847 A1 | 11/1994 |
| EP | 0 644 470 A2 | 3/1995 |
| EP | 0 697 586 A2 | 2/1996 |
| EP | 0 749 057 A1 | 12/1996 |
| EP | 0 825 506 A2 | 7/1997 |
| EP | 0 827 096 A2 | 9/1997 |
| EP | 0 838 768 A2 | 9/1997 |
| EP | 1 058 093 A1 | 5/1999 |
| EP | 0 335 957 B1 | 11/1999 |
| EP | 1 022 626 A2 | 7/2000 |
| EP | 1 819 028 A2 | 8/2007 |
| FR | 2 302 514 | 9/1976 |
| FR | 2 334 827 | 7/1977 |
| GB | 928704 | 6/1963 |
| GB | 1 534 280 | 11/1978 |
| GB | 1 534 288 | 11/1978 |
| GB | 2 310 346 A | 8/1997 |
| GB | 2 317 969 | 4/1998 |
| GB | 2 342 453 A | 4/2000 |
| GB | 2 347 232 A | 8/2000 |
| JP | 56-031573 | 3/1981 |
| JP | 57196619 | 2/1982 |
| JP | 58-129316 | 8/1983 |
| JP | 59-116811 | 7/1984 |
| JP | 59-163520 | 9/1984 |
| JP | 59-176643 | 10/1984 |
| JP | 59-211196 | 11/1984 |
| JP | 59-211896 | 11/1984 |
| JP | 60-000507 | 1/1985 |
| JP | 60-76619 | 5/1985 |
| JP | 60-131495 | 7/1985 |
| JP | 60-174915 | 9/1985 |
| JP | 62-30915 | 2/1987 |
| JP | 62-080535 | 4/1987 |
| JP | 62-50901 | 9/1987 |
| JP | 63-169532 | 7/1988 |
| JP | 64-01914 | 1/1989 |
| JP | 64-72699 | 3/1989 |
| JP | 11-87430 | 7/1989 |
| JP | 2-05105 | 1/1990 |
| JP | 3-229124 | 10/1991 |
| JP | 4-70906 | 3/1992 |
| JP | 5-122768 | 5/1993 |
| JP | 6-95882 | 4/1994 |
| JP | 06242192 | 9/1994 |
| JP | 06-248224 | 10/1994 |
| JP | 7-063586 | 3/1995 |
| JP | 07234988 | 9/1995 |
| JP | 8-054923 | 2/1996 |
| JP | 8-102241 | 4/1996 |
| JP | 08-114638 | 5/1996 |
| JP | 8-136386 | 5/1996 |
| JP | 8-166309 | 6/1996 |
| JP | 8-247076 | 9/1996 |
| JP | 8-313466 | 11/1996 |
| JP | 2712625 | 10/1997 |
| JP | 2712701 | 10/1997 |
| JP | 2753592 | 3/1998 |
| JP | 07225530 | 5/1998 |
| JP | 10-232170 | 9/1998 |
| JP | 11-083575 | 3/1999 |
| JP | 11-112524 A | 4/1999 |
| RU | 2190267 C2 | 9/2002 |
| RU | 39728 | 8/2004 |
| UK | 2 394 124 | 4/2004 |
| WO | WO 94/25933 | 11/1994 |
| WO | WO 95/23361 | 8/1995 |
| WO | WO 96/11389 | 4/1996 |
| WO | WO 96/12993 | 5/1996 |
| WO | WO 96/39617 | 12/1996 |
| WO | WO 97/21157 | 6/1997 |
| WO | WO 97/25603 | 7/1997 |
| WO | WO 98/06024 | 2/1998 |
| WO | WO 98/13677 | 4/1998 |
| WO | WO 98/14855 | 4/1998 |
| WO | WO 98/20469 | 5/1998 |
| WO | WO 98/39718 | 9/1998 |
| WO | WO 99/19782 | 4/1999 |
| WO | WO 00/41050 | 7/2000 |
| WO | WO 00/50851 | 8/2000 |
| WO | WO 00/55700 | 9/2000 |
| WO | WO 00/70531 | 11/2000 |
| WO | WO 01/01213 A1 | 1/2001 |
| WO | WO 01/19440 | 3/2001 |
| WO | WO 01/77766 | 10/2001 |
| WO | WO 01/90704 A2 | 11/2001 |
| WO | WO 02/27418 | 4/2002 |
| WO | WO 03/081002 | 10/2003 |
| WO | WO 2009/003146 | 12/2008 |
| WO | WO 2009/003148 | 12/2008 |

OTHER PUBLICATIONS

International Search Report and Written Opinion of Application No. PCT/US2006/022161, filed Jun. 7, 2007.

First Office Action from Chinese Patent Application 200680014971, filed Jun. 7, 2006.

U.S. Appl. No. 09/257,896, filed Feb. 25, 1999, Eryurek et al.

"A TCP\IP Tutorial" by, Socolofsky et al., Spider Systems Limited, Jan. 1991 pp. 1-23.

"Approval Standards for Explosionproof Electrical Equipment General Requirements", Factory Mutual Research, Cl. No. 3615, Mar. 1989, pp. 1-34.

"Approval Standard Intrinsically Safe Apparatus and Associated Apparatus for Use in Class I, II, and III, Division 1 Hazardous (Classified) Locations", Factory Mutual Research, Cl. No. 3610, Oct. 1988, pp. 1-70.

"Automation On-line" by, Phillips et al., Plant Services, Jul. 1997, pp. 41-45.

"Climb to New Heights by Controlling your PLCs Over the Internet" by, Phillips et al., Intech, Aug. 1998, pp. 50-51.

"CompProcessor for Piezoresistive Sensors" MCA Technologies Inc. (MCA7707), pp. 1-8.

"Ethernet emerges as viable, inexpensive fieldbus", Paul G. Schreier, Personal Engineering, Dec. 1997, p. 23-29.

"Ethernet Rules Closed-loop System" by, Eidson et al., Intech, Jun. 1998, pp. 39-42.

"Fieldbus Standard for Use in Industrial Control Systems Part 2: Physical Layer Specification and Service Definition", ISA-S50.02-1992, pp. 1-93.

"Fieldbus Standard for Use in Industrial Control Systems Part 3: Data Link Service Definition", ISA-S50.02-1997, Part 3, Aug. 1997, pp. 1-159.

Fieldbus Standard for Use in Industrial Control Systems Part 4: Data Link Protocol Specification, ISA-S50.02-1997, Part 4, Aug. 1997, pp. 1-481.

"Fieldbus Support for Process Analysis" by, Blevins et al., Fisher-Rosemount Systems, Inc., 1995, pp. 121-128.

"Fieldbus Technical Overview Understanding Foundation™ fieldbus technology", Fisher-Rosemount, 1998, pp. 1-23.

"Hypertext Transfer Protocol—HTTP/1.0" by, Berners-Lee et al., MIT/LCS, May 1996, pp. 1-54.

"Infranets, Intranets, and the Internet" by, Pradip Madan, Echelon Corp, Sensors, Mar. 1997, pp. 46-50.

"Internet Technology Adoption into Automation" by, Fondl et al., Automation Business, pp. 1-5.

"Internet Protocol Darpa Internet Program Protocol Specification" by, Information Sciences Institute, University of Southern California, RFC 791, Sep. 1981, pp. 1-43.

"Introduction to Emit", emWare, Inc., 1997, pp. 1-22.

"Introduction to the Internet Protocols" by, Charles L. Hedrick, Computer Science Facilities Group, Rutgers University, Oct. 3, 1988, pp. 1-97.

"Is There a Future for Ethernet in Industrial Control?", Miclot et al., Plant Engineering, Oct. 1988, pp. 44-46, 48, 50.

LFM/SIMA Internet Remote Diagnostics Research Project Summary Report, Stanford University, Jan. 23, 1997, pp. 1-6.

"Managing Devices with the Web" by, Howard et al., Byte, Sep. 1997, pp. 45-64.

"Modular Microkernel Links GUI and Browser for Embedded Web Devices" by, Tom Williams, pp. 1-2.

"PC Software Gets Its Edge From Windows, Components, and the Internet", Wayne Labs, I&CS, Mar. 1997, pp. 23-32.

Proceedings Sensor Expo, Aneheim, California, Produced by Expocon Managemnet Associates, Inc., Apr. 1996, pp. 9-21.

Proceedings Sensor Expo, Boston, Massachuttes, Produced by Expocon Management Associates, Inc., May 1997, pp. 1-416.

"Smart Sensor Network of the Future" by, Jay Warrior, Sensors, Mar. 1997, pp. 40-45.

"The Embedded Web Site" by, John R. Hines, IEEE Spectrum, Sep. 1996, p. 23.

"Transmission Control Protocol: Darpa Internet Program Protocol Specification" Information Sciences Institute, Sep. 1981, pp. 1-69.

"On-Line Statistical Process Control for a Glass Tank Ingredient Scale," by R.A. Weisman, *IFAC real Time Programming*, 1985, pp. 29-38.

"The Performance of Control Charts for Monitoring Process Variation," by C. Lowry et al., *Commun. Statis.—Simula.*, 1995, pp. 409-437.

"A Knowledge-Based Approach for Detection and Diagnosis of Out-Of-Control Events in Manufacturing Processes," by P. Love et al., *IEEE*, 1989, pp. 736-741.

"Advanced Engine Diagnostics Using Universal Process Modeling", by P. O'Sullivan, *Presented at the 1996 SAE Conference on Future Transportation Technology*, pp. 1-9.

Parallel, Fault-Tolerant Control and Diagnostics System for Feedwater Regulation in PWRS, by E. Eryurek et al., *Proceedings of the American Power Conference*.

"Programmable Hardware Architectures for Sensor Validation", by M.P. Henry et al., *Control Eng. Practice*, vol. 4, No. 10., pp. 1339-1354, (1996).

"Sensor Validation for Power Plants Using Adaptive Backpropagation Neural Network," *IEEE Transactions on Nuclear Science*, vol. 37, No. 2, by E. Eryurek et al. Apr. 1990, pp. 1040-1047.

"Signal Processing, Data Handling and Communications: The Case for Measurement Validation", by M.P. Henry, *Department of Engineering Science, Oxford University*.

"Smart Temperature Measurement in the '90s", by T. Kerlin et al., C&I, (1990).

"Software-Based Fault-Tolerant Control Design for Improved Power Plant Operation," *IEEE/IFAC Joint Symposium on Computer-Aided Control System Design*, Mar. 7-9, 1994 pp. 585-590.

A Standard Interface for Self-Validating Sensors, by M.P. Henry et al., *Report No. QUEL 1884/91*, (1991).

"Taking Full Advantage of Smart Transmitter Technology Now," by G. Orrison, *Control Engineering*, vol. 42, No. 1, Jan. 1995.

"Using Artificial Neural Networks to Identify Nuclear Power Plant States," by Israel E. Alguindigue et al., pp. 1-4.

"Application of Neural Computing Paradigms for Signal Validation," by B.R. Upadhyaya et al., *Department of Nuclear Engineering*, pp. 1-18.

"Application of Neural Networks for Sensor Validation and Plant Monitoring," by B. Upadhyaya et al., *Nuclear Technology*, vol. 97, No. 2, Feb. 1992 pp. 170-176.

"Automated Generation of Nonlinear System Characterization for Sensor Failure Detection," by B.R. Upadhyaya et al., ISA, 1989 pp. 269-274.

"In Situ Calibration of Nuclear Plant Platinum Resistance Thermometers Using Johnson Noise Methods," *EPRI*, Jun. 1983.

"Johnson Noise Thermometer for High Radiation and High-Temperature Environments," by L. Oakes et al., *Fifth Symposium on Space Nuclear Power Systems*, Jan. 1988, pp. 2-23.

"Development of a Resistance Thermometer for Use Up to 1600°C", by M.J. de Groot et al., *CAL LAB*, Jul./Aug. 1996, pp. 38-41.

"Survey, Applications, and Prospects of Johnson Noise Thermometry," by T. Blalock et al., *Electrical Engineering Department*, 1981 pp. 2-11.

"Noise Thermometry for Industrial and Metrological Applications at KFA Julich," by H. Brixy et al., *7th International Symposium on Temperature*, 1992.

"Johnson Noise Power Thermometer and its Application in Process Temperature Measurement," by T.V. Blalock et al., *American Institute of Physics* 1982, pp. 1249-1259.

"Field-based Architecture is Based on Open Systems, Improves Plant Performance", by P. Cleaveland, *I&CS*, Aug. 1996, pp. 73-74.

"Tuned-Circuit Dual-Mode Johnson Noise Thermometers," by R.L. Shepard et al., Apr. 1992.

"Tuned-Circuit Johnson Noise Thermometry," by Michael Roberts et al., *7th Symposium on Space Nuclear Power Systems*, Jan. 1990.

"Smart Field Devices Provide New Process Data, Increase System Flexibility," by Mark Boland, *I&CS*, Nov. 1994, pp. 45-51.

"Wavelet Analysis of Vibration, Part I: Theory[1]," by D.E. Newland, *Journal of Vibration and Acoustics*, vol. 116, Oct. 1994, pp. 409-416.

"Wavelet Analysis of Vibration, Part 2: Wavelet Maps," by D.E. Newland, *Journal of Vibration and Acoustics*, vol. 116, Oct. 1994, pp. 417-425.

"Development of a Long-Life, High-Reliability Remotely Operated Johnson Noise Thermometer," by R.L. Shepard et al., *ISA*, 1991, pp. 77-84.

"Application of Johnson Noise Thermometry to Space Nuclear Reactors," by M.J. Roberts et al., *Presented at the 6th Symposium on Space Nuclear Power Systems*, Jan. 9-12, 1989.

"A Decade of Progress in High Temperature Johnson Noise Thermometry," by T.V. Blalock et al., *American Institute of Physics*, 1982 pp. 1219-1223.

"Sensor and Device Diagnostics for Predictive and Proactive Maintenance", by B. Boynton, *A Paper Presented at the Electric Power Research Institute—Fossil Plant Maintenance Conference* in Baltimore, Maryland, Jul. 29-Aug. 1, 1996, pp. 50-1-50-6.

"Detection of Hot Spots in Thin Metal Films Using an Ultra Sensitive Dual Channel Noise Measurement System," by G.H. Massiha et al., *Energy and Information Technologies in the Southeast*, vol. 3 of 3, Apr. 1989, pp. 1310-1314.

"Detecting Blockage in Process Connections of Differential Pressure Transmitters", by E. Taya et al., *SICE*, 1995, pp. 1605-1608.

"Development and Application of Neural Network Algorithms for Process Diagnostics," by B.R. Upadhyaya et al., *Proceedings of the 29th Conference on Decision and Control*, 1990, pp. 3277-3282.

"A Fault-Tolerant Interface for Self-Validating Sensors", by M.P. Henry, *Colloquium*, pp. 3/1-3/2 (Nov. 1990).

"Fuzzy Logic and Artificial Neural Networks for Nuclear Power Plant Applications," by R.C. Berkan et al., *Proceedings of the American Power Conference*.

"Fuzzy Logic and Neural Network Applications to Fault Diagnosis", by P. Frank et al., *International Journal of Approximate Reasoning*, (1997), pp. 68-88.

"Keynote Paper: Hardware Compilation—A New Technique for Rapid Prototyping of Digital Systems-Applied to Sensor Validation", by M.P. Henry, *Control Eng. Practice*, vol. 3, No. 7., pp. 907-924, (1995).

"The Implications of Digital Communications on Sensor Validation", by M. Henry et al., *Report No. QUEL 1912/92*, (1992).

"In-Situ Response Time Testing of Thermocouples", *ISA*, by H.M. Hashemian et al., Paper No. 89-0056, pp. 587-593, (1989).

"An Integrated Architecture for Signal Validation in Power Plants," by B.R. Upadhyaya et al., *Third IEEE International Symposium on Intelligent Control*, Aug. 24-26, 1988, pp. 1-6.

"Integration of Multiple Signal Validation Modules for Sensor Monitoring," by B. Upadhyaya et al., *Department of Nuclear Engineering*, Jul. 8, 1990, pp. 1-6.

"Intelligent Behaviour for Self-Validating Sensors", by M.P. Henry, *Advances in Measurement*, pp. 1-7, (May 1990).

"Measurement of the Temperature Fluctuation in a Resistor Generating 1/F Fluctuation," by S. Hashiguchi, *Japanese Journal of Applied Physics*, vol. 22, No. 5, Part 2, May 1983, pp. L284-L286.

"Check of Semiconductor Thermal Resistance Elements by the Method of Noise Thermometry", by A. B. Kisilevskii et al., *Measurement Techniques*, vol. 25, No. 3, Mar. 1982, New York, USA, pp. 244-246.

"Neural Networks for Sensor Validation and Plant Monitoring," by B. Upadhyaya, *International Fast Reactor Safety Meeting*, Aug. 12-16, 1990, pp. 2-10.

"Neural Networks for Sensor Validation and Plantwide Monitoring," by E. Eryurek, 1992.

"A New Method of Johnson Noise Thermometry", by C.J. Borkowski et al., *Rev. Sci. Instrum.*, vol. 45, No. 2, (Feb. 1974) pp. 151-162.

"Thermocouple Continuity Checker," IBM Technical Disclosure Bulletin, vol. 20, No. 5, pp. 1954 (Oct. 1977).

"A Self-Validating Thermocouple," Janice C-Y et al., IEEE Transactions on Control Systems Technology, vol. 5, No. 2, pp. 239-253 (Mar. 1997).

*Instrument Engineers' Handbook*, Chapter IV entitled "Temperature Measurements," by T.J. Claggett, pp. 266-333 (1982).

"emWare's Releases Emit 3.0, Allowing Manufacturers to Internet and Network Enable Devices Royalty Free," 3 pages, PR Newswire (Nov. 4, 1998).

Warrior, J., "The IEEE P1451.1 Object Model Network Independent Interfaces for Sensors and Actuators," pp. 1-14, Rosemount Inc. (1997).

Warrior, J., "The Collision Between the Web and Plant Floor Automation," 6[Th]. WWW Conference Workshop on Embedded Web Technology, Santa Clara, CA (Apr. 7, 1997).

Microsoft Press Computer Dictionary, 3rd Edition, p. 124.

"Internal Statistical Quality Control for Quality Monitoring Instruments", by P. Girling et al., *ISA*, 15 pgs., 1999.

Web Pages from www.triant.com (3 pgs.).

"Statistical Process Control (Practice Guide Series Book)", *Instrument Society of America*, 1995, pp. 1-58 and 169-204.

"Time-Frequency Analysis of Transient Pressure Signals for a Mechanical Heart Valve Cavitation Study," *ASAIO Journal*, by Alex A. Yu et al., vol. 44, No. 5, pp. M475-M479, (Sep.-Oct. 1998).

"Transient Pressure Signals in Mechanical Heart Valve Caviation," by Z.J. Wu et al., pp. M555-M561 (undated).

"Caviation in Pumps, Pipes and Valves," *Process Engineering*, by Dr. Ronald Young, pp. 47 and 49 (Jan. 1990).

"Quantification of Heart Valve Cavitation Based on High Fidelity Pressure Measurements," *Advances in Bioengineering 1994*, by Laura A. Garrison et al., BED—vol. 28, pp. 297-298 (Nov. 6-11, 1994).

"Monitoring and Diagnosis of Cavitation in Pumps and Valves Using the Wigner Distribution," *Hydroacoustic Facilities, Instrumentation, and Experimental Techniques*, NCA—vol. 10, pp. 31-36 (1991).

"Developing Predictive Models for Cavitation Erosion," *Codes and Standards in a Global Environment*, PVP-vol. 259, pp. 189-192 (1993).

"Self-Diagnosing Intelligent Motors: A Key Enabler for Next Generation Manufacturing System," by Fred M. Discenzo et al., pp. 3/1-3/4 (1999).

"A Microcomputer-Based Instrument for Applications in Platinum Resistance Thermomety," by H. Rosemary Taylor and Hector A. Navarro, Journal of Physics E. Scientific Instrument, vol. 16, No. 11, pp. 1100-1104 (1983).

"Experience in Using Estelle for the Specification and Verification of a Fieldbus Protocol: FIP," by Barretto et al., Computer Networking, pp. 295-304 (1990).

"Computer Simulation of H1 Field Bus Transmission," by Utsumi et al., Advances in Instrumentation and Control, vol. 46, Part 2, pp. 1815-1827 (1991).

"Progress in Fieldbus Developments for Measuring and Control Application," by A. Schwaier, Sensor and Acuators, pp. 115-119 (1991).

"Ein Emulationssystem zur Leistungsanalyse von Feldbussystemen, Teil 1," by R. Hoyer, pp. 335-336 (1991).

"Simulatore Integrato: Controllo su bus di campo," by Barabino et al., Automazione e Strumentazione, pp. 85-91 (Oct. 1993).

"Ein Modulares, verteiltes Diagnose-Expertensystem für die Fehlerdiagnose in lokalen Netzen," by Jürgen M. Schröder, pp. 557-565 (1990).

"Fault Diagnosis of Fieldbus Systems," by Jürgen Quade, pp. 577-581 (Oct. 1992).

"Ziele und Anwendungen von Feldbussystemen," by T. Pfeifer et al., pp. 549-557 (Oct. 1987).

"Profibus Infrastructure Measures," by Tilo Pfeifer et al., pp. 416-419 (Aug. 1991).

"Simulation the Time Behaviour of Fieldbus Systems," by O. Schnelle, pp. 440-442 (1991).

"Modélisation et simulation d'un bus de terrain: FIP," by Song et al, pp. 5-9 (undated).

"Field Bus Networks for Automation Systems Containing Intelligent Functional Unites," by W. Kriesel et al., pp. 486-489 (1987).

"Field Buses for Process Interconnection with Digital Control Systems," Tecnología, pp. 141-147 (1990).

"Decentralised Systems with Real-Time Field Bus," Netzwerke, Jg. Nr.3 v. 14.3, 4 pages (1990).

"Process Measurement and Analysis," by Liptak et al., Instrument Engineers' Handbook, Third Edition, pp. 528-530, (1995).

"Improving Dynamic Performance of Temperature Sensors With Fuzzy Control Techniques," by Wang Lei et al., pp. 872-873 (1992).

"Microsoft Press Computer Dictionary" 2nd Edition, 1994, Microsoft Press. p. 156.

International Search Report from Application No. PCT/US01/40791 with international filing date of May 22, 2001.

International Search Report from Application No. PCT/US01/40782 with international filing date of May 22, 2001.

International Search Report from Application No. PCT/02/14560 with international filing date of May 8, 2002.

International Search Report from Application No. PCT/US02/14934 with international filing date of May 8, 2002.

"On-Line Tool Condition Monitoring System With Wavelet Fuzzy Neural Network," by Li Xiaoli et al., pp. 271-276 (1997).

"Optimal Design of the Coils of an Electromagnetic Flow Meter," by Michalski, A. et al., IEEE Transactions on Magnetics, vol. 34, Issue 5, Part 1, pp. 2563-2566 (1998).

"Magnetic Fluid Flow Meter for Gases," Popa, N.C., IEEE Transactions on Magnetics, vol. 30, Issue 2, Part 1-2, pp. 936-938 (1993).

"New Approach to a Main Error Estimation for Primary Transducer of Electromagnetic Flow Meter," by Michalski, A., IEEE Instrumentation and Measurement Technology Conference Proceedings, vol. 2, pp. 1093-1097 (1998).

"Additional Information From Flowmeters Via Signal Analysis," by Amadi-Echendu, J.E. et al., IEEE Instrumentation and Measurement Technology Conference Record, vol. 7, pp. 187-193 (1990).

International Search Report from Application No. PCT/US02/06606 with international filed of Mar. 5, 2002.

International Search Report from Application No. PCT/US02/30465 with international filed of Sep. 25, 2002.

"What is a weighted moving average?", *DAU Stat Refresher*, http://cne.gmu.edu/modules/dau/stat/mvavgs/wma_bdy,html. (1995).

"Statistics Glossary: Time Series Data", by Easton et al., http://www.stats.gla.ac.uk/steps/glossary/time_series.html, Sep. 1997.

"The Indicators Story", Sustainable Seattle, pp. 55-59, 1998.

"Detecting Regimes in Temperature Time Series", by Clemins et al., *Artificial Neural Networks in Engineering, Proceedings*, pp. 727-732, 2001.

"Re: Digital Filter-Moving Average", The Math Forumn, http://mathforum.org/discuss/sci.math/a/t/177212, Sep. 28, 1998.

U.S. Appl. No. 10/675,014, filed Sep. 2003, Longsdorf et al.

U.S. Appl. No. 10/744,809, filed Dec. 2003, Brown et al.

"Notification of Transmittal of the International Search Report and the Written Opinion of the International Searching Authority", or the Declaration for PCT/US2004/017300.

U.S. Appl. No. 10/893,144, filed Jul. 2004, Brown et al.

"Invitation to Pay Additional Fees" for PCT/US2004/031678.

"Notification of Transmittal of the International Search Report or the Declaration", PCT/US2004/025291.

"Notification of Transmittal of the International Search Report or the Declaration", PCT/US2004/031678.

"Notification of Transmittal of the International Search Report or the Declaration", PCT/US2005/011385.

"Notification of Transmittal of the International Preliminary Report on Patenatability", PCT/US2004/031678.

"Notification of Transmittal of International Search Report and the Written Opinion", PCT/US2004/022736.

"Notification of Transmittal of the International Search Report", PCT/US00/14798.

"Notification of Transmittal of International Search Report and the Written Opinion", PCT/US2006/037535.

"Notification of Transmittal of International Search Report and the Written Opinion", PCT/US2007/012317.

Second Office Action from Chinese patent application No. 200680014971.5, dated Jun. 5, 2009.

Official Action for Russian patent application No. 2007149034, filed Jun. 7, 2006.

International Search Report and Written Opinion for application No. PCT/US2009/050662, dated Oct. 1, 2009.

Second Official Action from Russian patent application No. 2007149034, dated Nov. 16, 2009.

Communication dated Mar. 9, 2010 from related Russian application No. 2007149034.

Communication dated Feb. 9, 2010 from related European application No. 06772452.6.

Communication to attend oral proceedings from the European patent application No. 06772452,6 dated Jul. 16, 2010.

First Office Action from Japanese patent application No. 2008-515883 dated Nov. 30, 2010.

Technical Data Sheet: VIATOR® USB HART® Interface (Model 010031). MACTek Measurement and Control Technologies.

VIATOR®Bluetooth® Wireless Technology Interface for use with HART field devices. MACTek Measurement and Control Technologies retrieved from www.mactekcorp.com/product5.htm.

Product Data Sheet: VIATOR RS232. MACTek Measurement and Control Technologies retrieved from www.mactekcorp.com/product.htm.

Decision of Refusal from the European patent application No. 06 77 2452.6 dated Jan. 26, 2011.

Decision of Rejection for Japanese patent application No. 2008-515883 dated Aug. 2, 2011.

* cited by examiner

MULTI-PROTOCOL FIELD DEVICE INTERFACE WITH AUTOMATIC BUS DETECTION

CROSS-REFERENCE TO RELATED APPLICATION

The present application is based on and claims the benefit of U.S. provisional patent application Ser. No. 60/688,657, filed Jun. 8, 2005, the content of which is hereby incorporated by reference in its entirety.

BACKGROUND OF THE INVENTION

Field devices are used in industries to control operation of a process such as an oil refinery. A field device, such as a transmitter, is typically part of a process communication loop and is located in the field to measure and transmit a process variable such as pressure, flow or temperature, for example, to control room equipment. A field device such as a valve controller can also be part of the process communication loop and controls position of a valve based upon a control signal received over the process control loop, or generated internally. Other types of controllers control electric motors or solenoids, for example. The control room equipment is also part of the process communication loop such that an operator or computer in the control room is capable of monitoring the process based upon process variables received from transmitters in the field and responsively controlling the process by sending control signals to the appropriate control devices. A process communication loop sometimes includes a portable communicator which is capable of monitoring and transmitting signals on the process communication loop. Typically, such portable communicators are used to configure field devices which form the process communication loop. As used herein, the term "process communications loop" is intended to mean any physical connection and media that carries process signals, regardless of whether the connection forms an actual loop. Thus, a process communication loop can be a HART® or FOUNDATION™ Fieldbus segment, even though such a segment is not strictly considered a loop.

With the advent of low-power microprocessors, field devices have undergone significant changes. Years ago, a field device would simply measure a given process variable, such as temperature, and generate an analog indication in the form of a current varying between 4 and 20 (mA) to indicate the measured temperature. Currently, many field devices employ digital communication technology as well as more sophisticated control and communication techniques. Field devices often employ low-power electronics because in many installations they are still required to run on as little as 4 mA. This design requirement prohibits the use of a number of commercially available microprocessor circuits. However, even low-power microprocessors have allowed a vast array of functions for such field devices.

There has been a dramatic increase in the availability of such microprocessor-based field devices. Such field devices are sometimes termed "smart" or "intelligent." There has also been a dramatic increase in the availability of software applications that are used to configure, test, and diagnose these smart field devices. Connection of a general purpose computing device, such as a personal computer (PC) or a portable laptop computer is typically accomplished using a modem between the computing device and the intelligent field devices. There is a significant array of process communication protocols such as the HART®, FOUNDATION™ Fieldbus, Modbus®, and Profibus protocols that support the various process control tasks. Moreover, it is common to find multiple communication protocols in use in the very same process installation.

One technique for coupling a general purpose computing device to process communication networks having various process communication protocols is found in U.S. Pat. No. 6,839,790. The '790 patent reports an interface device that includes a re-configurable circuit which provides access to a selected fieldbus network from among several optional fieldbus networks. However, the techniques taught by the '790 patent generally require a user to have a priori knowledge of the particular type of fieldbus to which he or she is connecting. Thus, if a user wants to connect to a Profibus network, the user must make that selection known, and then the interface will reconfigure itself. However, if the user does not know what type of process communication protocol is being used, or if the user's selection is erroneous, the interface may begin communicating using a protocol that is not compatible with the actual protocol in use. This may introduce dangerous signaling levels that may damage, or otherwise degrade communication on the process control loop; damage or otherwise degrade the interface module itself, or potentially interfere with the proper operation of the process control loop.

SUMMARY OF THE INVENTION

A multi-protocol interface for coupling a field device to a general purpose computer is disclosed. The interface includes loop measurement circuitry to perform a plurality of measurements on a connected process communication loop to determine a process communication loop type. Then, if the interface includes a protocol interface module that matches the detected loop type, the protocol interface module can be engaged. A method for coupling a field device to a general purpose computer is also provided. In one aspect, power from the general purpose computer is used to power the process communication loop, if the interface determines that the loop is not powered.

DETAILED DESCRIPTION OF ILLUSTRATIVE EMBODIMENTS

Figure 1:
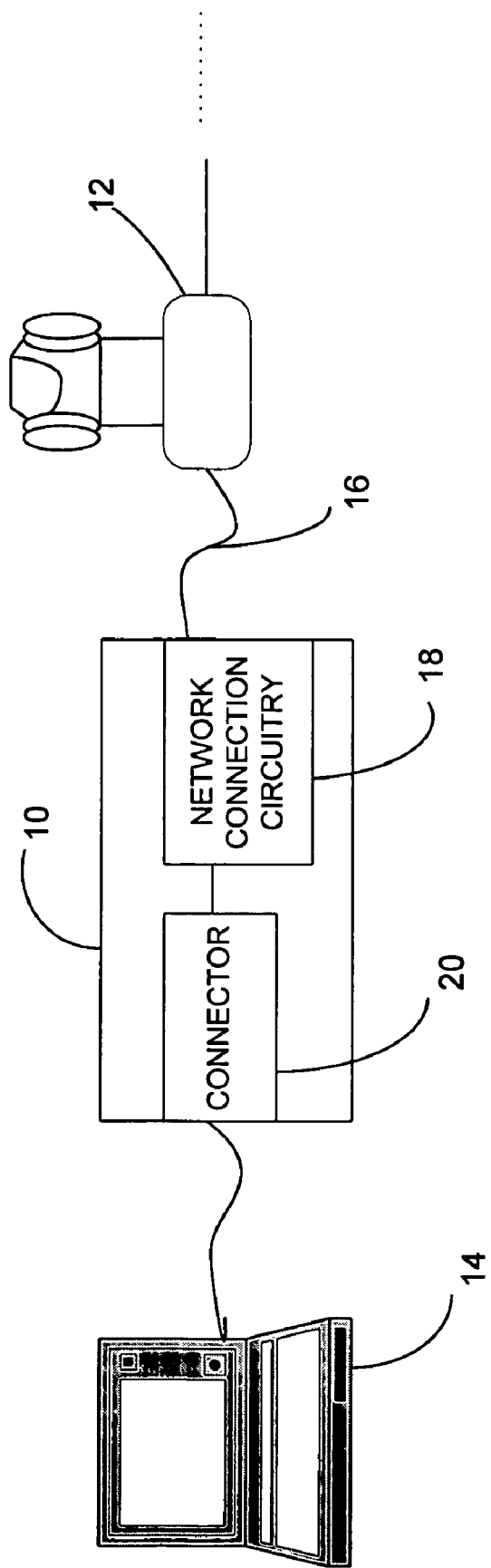
FIG. 1 is a diagrammatic view of a multi-protocol interface coupling a field device to a general purpose computing device in accordance with an embodiment of the present invention.

FIG. 1 is a diagrammatic view of a multi-protocol interface coupling a field device to a general purpose computing device in accordance with an embodiment of the present invention. Multi-protocol interface 10 couples field device 12 to general purpose computing device 14, which is illustrated as a laptop computer. The coupling between multi-protocol interface 10 and field device 12 may be effected via direct connection, such as via wiring terminals within the field device, or through process communication loop 16. Multi-protocol interface 10 includes network connection circuitry 18 that is configured to couple to process communication loops, and a connector module 20 that is configured to couple to general purpose computing device 14. Connector module 20 may include any suitable form of connector for connecting to computer 14. Suitable examples include, but are not limited to, universal serial bus (USB) connections, standard serial connections such as those that employ DB9 or DB25 connectors, parallel connections, PCMCIA connections, PCI connections, and firewire connections. In embodiments of the present invention where connector module 20 includes a wired connection to general purpose computing device 14, it is preferred that multi-protocol interface 10 be powered through the wired communication interface. Embodiments of the present invention can also be practiced where the data communication between multi-protocol interface module 10 and general purpose computing device 14 is a wireless connection. Examples of suitable wireless connections include infrared communication, Bluetooth communication, and WIFI communication (such as IEEE 802.11b or IEEE 802.11g). Further, as the art of general purpose computing devices advances, embodiments of the present invention can be practiced using any suitable data communication for which the general purpose computer is adapted, whether now known, or later developed.

Figure 2:
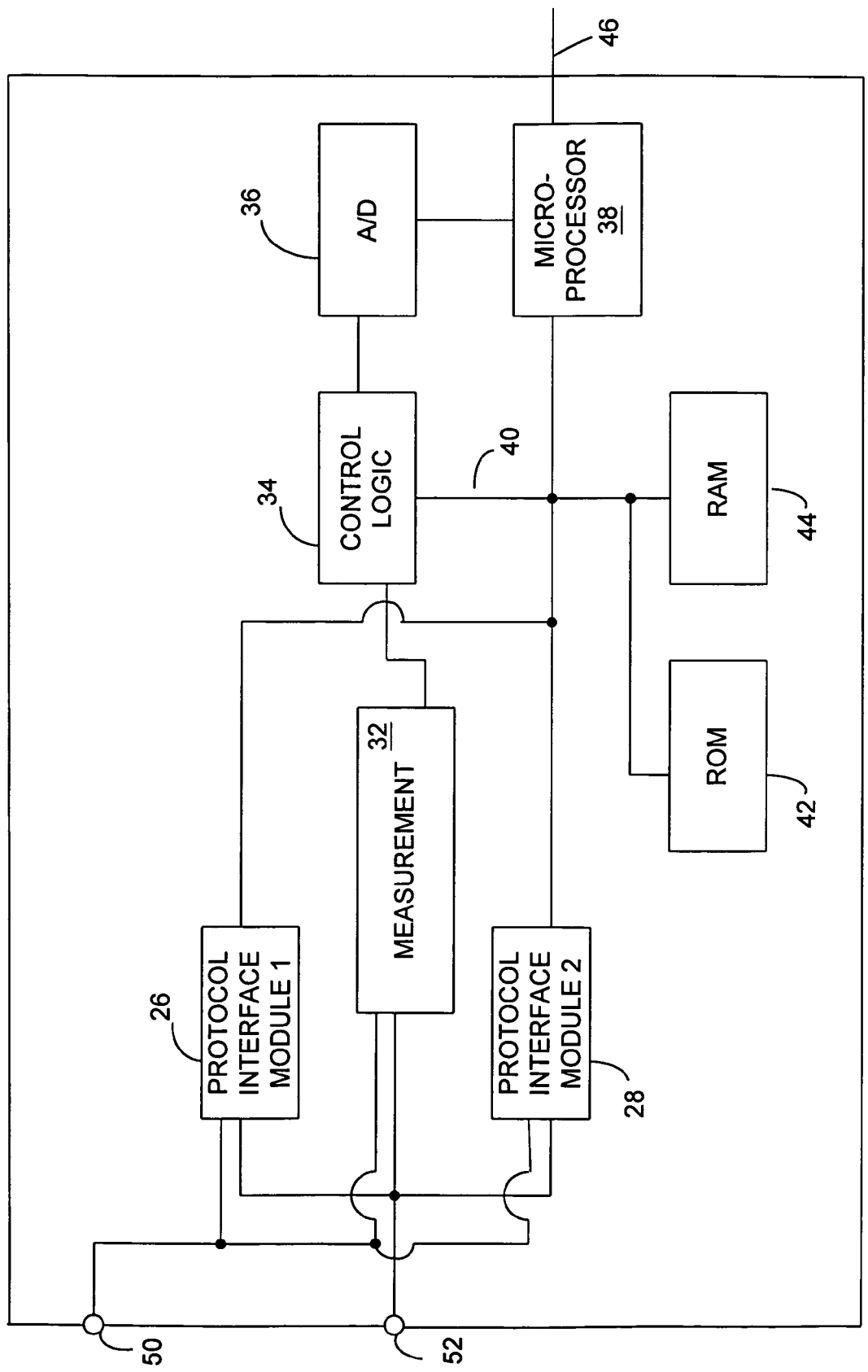
FIG. 2 is a block diagram of modem module 18 in accordance with embodiments of the present invention.

FIG. 2 is a block diagram of network connection circuitry 18 in accordance with embodiments of the present invention. As illustrated, network connection circuitry 18 includes microprocessor 38 that is configured to couple, via line 46, to connector module 20 (show in FIG. 1). Circuitry 18 also includes analog-to-digital converter 36 which is coupled to microprocessor 38. Converter 36 is coupled to measurement circuitry 32 via control logic 34. Microprocessor 38 is also coupled to external data bus 40 through which it interacts with read only memory 42 and random access memory 44. Through data bus 40, microprocessor 38 is also able to interact with first protocol interface module 26 and a protocol interface module 28. Each of modules 26 and 28 is designed to communicate in accordance with a standard process communication protocol. For example, first protocol interface module 26 may be configured to communicate in accordance with the HART® protocol while second protocol interface module 28 is configured to communicate in accordance with the FOUNDATION™ Fieldbus protocol. Additionally, while FIG. 2 illustrates a pair of modules, embodiments of the present invention can be practiced by employing three or more such protocol interface modules. Each protocol interface module allows communication in accordance with its respective process communication protocol.

As described above, if the wrong type of protocol interface module communicates over a process communication loop, incompatible signal levels, data, interference, or other undesirable effects can diminish the communication capabilities of the process communication network, or even damage the associated devices. In accordance with an embodiment of the present invention, network connection circuitry 18 includes loop measurement circuitry 32. As illustrated in FIG. 2, module 18 includes a pair of terminals 50, 52 with each of terminals 50, 52 being coupled to each of protocol interface modules 26 and 28, and to loop measurement circuitry 32. Utilization of loop measurement circuitry 32 allows network connection circuitry 18 to make various measurements to connected process communication loops, before engaging one of protocol interface modules 26 or 28.

The circuitry of multi-protocol interface 10 preferably facilitates compliance with intrinsic safety requirements. Compliance with intrinsic safety requirements means compliance with an intrinsic Safety specification such as one or more of the portions of the standard promulgated by Factory Mutual Research in October 1998, entitled APPROVAL STANDARD INTRINSICALLY SAFE APPARATUS AND ASSOCIATED APPARATUS FOR USE IN CLASS I, II AND III, DIVISION 1 HAZARDOUS (CLASSIFIED) LOCATIONS, CLASS NUMBER 3610.

When operating with a HART® process control loop, interface 10 must not sink or source a direct current (DC). To meet intrinsic safety requirements for FOUNDATION™ Fieldbus, interface 10 must not inject any energy into the process control loop. Because these two protocols have two fundamentally different (and conflicting) ways of communicating, the circuitry of interface 10 must never sink a current in a HART® process control loop nor inject energy (impose a voltage) in a FOUNDATION™ Fieldbus segment.

As illustrated in FIG. 2, network connection circuitry 18 includes loop measurement circuitry 32 that includes one or more individual measurement signal conditioning circuits. Preferably, circuitry 32 includes a circuit that can sink a small amplitude short duration current from the network. In another embodiment, circuitry 32 may include three or more individual measurement conditioning circuits that scale the voltage signal on the FOUNDATION™ Fieldbus network connector to measure DC voltage, communications signal amplitude, and network or loop noise. Measurement circuitry 32 may also include a measurement circuit that measures DC voltage on the network. These various signal conditioning circuits all feed control logic block 34. Control logic block 34 includes a multiplexer that is connected to analog-to-digital converter 36. Control logic block 34 is accessed by microprocessor 38 via bus 40. Although FIG. 2 illustrates the connection between microprocessor 38 and converter 36 separate from data bus 40, embodiments of the present invention can be practiced with converter 36 coupled to microprocessor 38 any suitable external bus including a Serial Peripheral Interface (SPI). When interface 10 is first turned on, or provided with power, microprocessor 38 commands analog-to-digital converter 36 to monitor the DC voltage on network connection terminals 50 and 52. During this state, interface 10 will not disturb the network (also referred to as process control loop) in any way (i.e., sink/source current or impose a voltage). If there are no network connections, the voltage measured will be near zero on the loop connection. When a process control loop is coupled to terminals 50 and 52, a DC voltage will be measured. A HART® process control loop will cause a voltage between approximately 12 and 50 volts DC to be measured while a FOUNDATION™ Fieldbus loop connection will cause a voltage between 9 and 32 volts DC to be measured. Once a DC voltage is recognized, the polarity is measured to determine whether the loop connection leads are correctly connected. Specifically, if the DC voltage measured between common lead 50 and lead 52 has a negative polarity, that means that the loop connection leads are reversed. Microprocessor 38 then preferably sends a message informing the user that the loop connection leads must be reversed. In one embodiment, when interface 10 determines that the polarity is reversed, interface 10 ensures that when a protocol interface module is later engaged, that it is engaged in such a way that the reversed polarity is automatically corrected using circuitry of the interface. This correction can be effected simply using switches that essentially reverse the terminals before entering each protocol interface unit. However, other forms of circuitry and/or approaches can be utilized to automatically correct the polarity.

As indicated above, there is an overlap between the operating DC voltages used on both HART® and FOUNDATION™ Fieldbus process communication loops. Therefore, DC voltage alone cannot be used to reliably indicate the type of loop to which device 10 is connected. To determine loop type, interface 10, using measurement circuitry 32 actually measures the DC impedance of the process control loop (preferably having a reasonable DC voltage and correct lead polarity). Interface 10 measures network DC impedance by sinking a small amount of current, for example, 1 mA, for a very short duration, such as 5 milliseconds, and then measuring the shape and amplitude of the resultant voltage pulse on the process communication loop. This disturbance generates a voltage pulse along the process control loop that is proportional to the DC impedance of the process control loop itself. There is a distinguishing range of impedance between HART® and FOUNDATION™ Fieldbus process control loops. The signal that interface 10 observes in response to the disturbance it generates also contains any HART® or FOUNDATION™ Fieldbus communication signals that may be present on the process control loop. The communication signals themselves are filtered using the suitable low pass filter so that only the effect of the short-duration pulse is observed by device 10. Analog-to-digital converter 36 measures the amplitude of the associated disturbance to determine the network type from this voltage measurement. A FOUNDATION™ Fieldbus network will have a computed impedance of approximately 50 ohms. A HART® network will have a computed impedance greater than approximately 125 ohms. If the network or process control loop type detected accords with one of protocol interface modules 26 or 28, then communications can proceed by engaging that respective protocol interface module.

Figure 3:
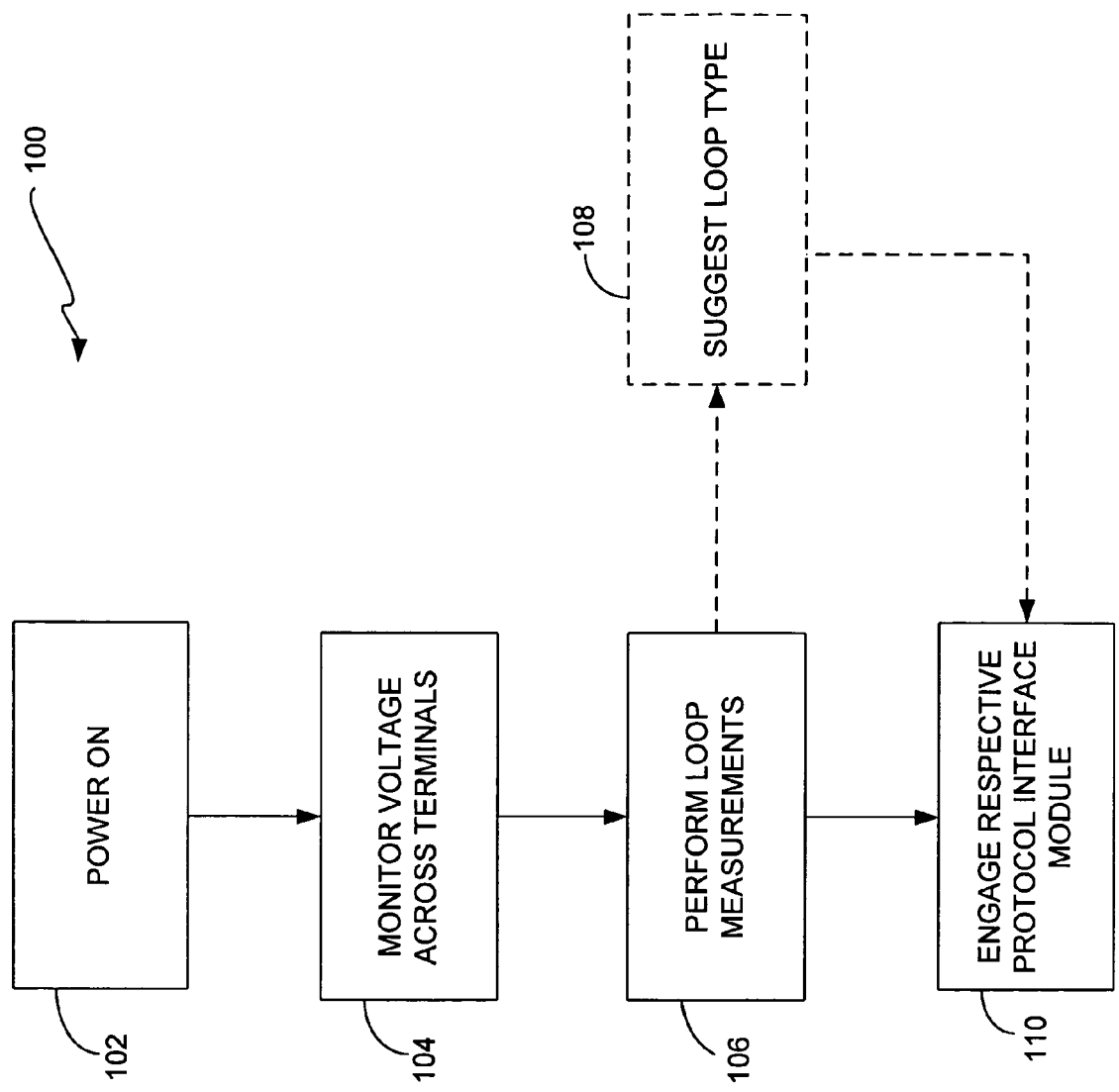
FIG. 3 is a flow diagram of a method of coupling a general purpose computer to a process communication loop using a multi-protocol process communication module in accordance with an embodiment of the present invention.

FIG. 3 is a flow diagram of a method of coupling a general purpose computer to a process communication loop using a multi-protocol process communication module in accordance with an embodiment of the present invention. Method 100 begins at block 102 when the multi-protocol interface is first powered. This step may occur when the interface is first coupled to a general purpose computer and receives electrical operating energy from the computer, or simply when a user engages a switch or other suitable object on the interface module to turn the device on. Method 100 continues at block 104 where the multi-protocol interface monitors the voltage across its process communication terminals. This step continues until a non-zero voltage is observed across the process communication or loop terminals. Once this occurs, control passes to block 106 where the multi-protocol interface performs one or more loop-related measurements using loop measurement circuitry as described above. The loop-related measurements are performed until the type of process communication loop can be discerned, or until all available measurements are exhausted. FIG. 3 indicates optional block 108 that can be employed in accordance with embodiments of the present invention. Specifically, once loop-related measurement(s) are performed, a suggestion regarding the type of process communication loop can be automatically provided to the user. The user can then confirm the process communication selection and the associated media access unit will be engaged. Providing an automatic suggestion to a user is unlike allowing a user to simply select a media access unit. For example, if the user erroneously believes that he or she is interacting with a HART® process communication loop, but the multi-protocol interface reports, through its connection with general purpose computing device 14, that the loop-related measurements actually indicate a FOUNDATION™ Fieldbus loop, the user's options are to either acquiesce to the FOUNDATION™ Fieldbus suggestion, or to not engage interface 10 on the loop. Thus, the user's erroneous belief that the process communication loop is a HART® loop is kept from damaging or degrading the communications and/or devices. At block 110, the associated protocol interface module that corresponds to the loop-related measurements and optionally with the user's acknowledgment of the autosuggestion as indicated in block 108 is engaged.

Embodiments of the present invention generally include detection circuitry that automatically detects the communication protocol of a process communication loop. Additionally, embodiments of the present invention also preferably automatically detect parameters of the communication protocol in order to enable appropriate communications. Embodiments of the present invention generally advise users of incompatible protocols, and protect users from using the wrong communication protocol for the connected devices. For example, when connected to a powered HART® loop, the device automatically detects HART® protocol parameters, and automatically enables HART® communication between the general purpose computing device and the HART® field devices on the loop. When connected to a powered FOUNDATION™ Fieldbus segment, the device automatically detects FOUNDATION™ Fieldbus protocol parameters, and automatically enables FOUNDATION™ Fieldbus communication between the general purpose computing device and FOUNDATION™ Fieldbus field devices on the segment.

Figure 4:
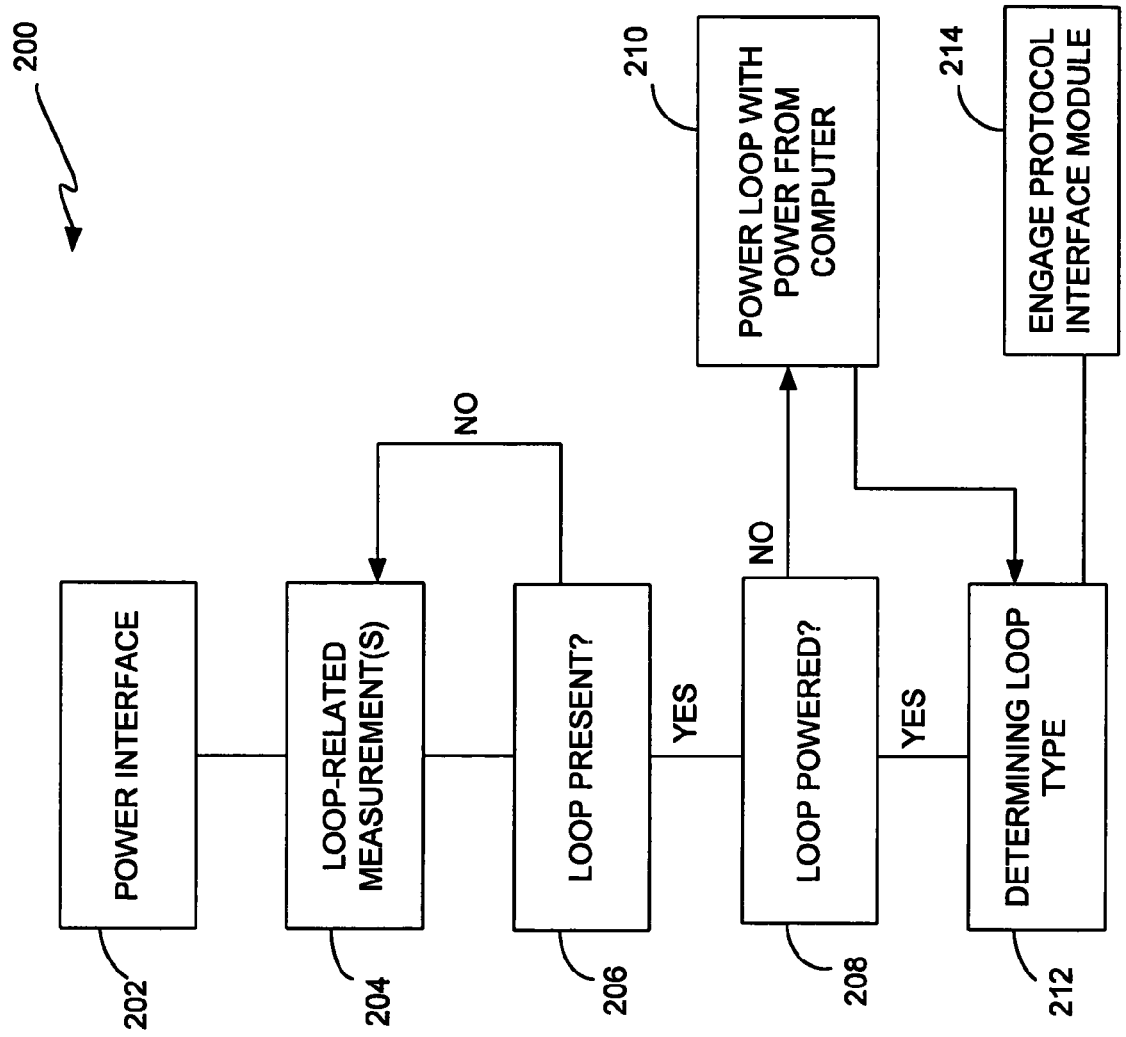
FIG. 4 is a flow diagram of a method of coupling a general purpose computer to a process communication loop in accordance with an embodiment of the present invention.

FIG. 4 is a flow diagram of a method of coupling a general purpose computer to a process communication loop in accordance with an embodiment of the present invention. Method 200 begins at block 202 when the interface is first powered. Block 202 can occur when the interface is first coupled to a general purpose computer, or when a user engages a switch on the interface. At block 204, the interface makes at least one measurement relative to the process communication terminals. Suitable measurements include attempting to detect a voltage, attempting to detect continuity between the process communication terminals, or any other suitable measurement. At block 206, the interface determines, using the results of the loop-related measurement(s), whether a process communication loop has been connected to the interface. If not, control returns to block 204, and the method continues waiting for a loop connection. However, if block 206 determines that a process communication loop has been coupled to the terminals of the interface, then control passes to block 208, where the interface determines if the loop is already powered. This step may be accomplished by using measurement circuitry, such as circuitry 32, to measure a voltage and/or impedance of the newly connected loop. If the newly connected loop is not powered, control passes to block 210 where the interface uses energy received from its connection to the general purpose computer (such as through a USB connection) to provide power to the process control loop. Once the interface has powered the process communication loop at block 210, control passes to block 212. If block 208 determines that the process communication loop is powered, control passes to block 212 from block 208. At block 212, measurement circuitry of the interface is again employed to make a plurality of measurements to determine the type of process control loop to which the interface is connected. Once sufficient measurements have been made, or if all measurements have been exhausted, control passes to block 214 where the protocol interface module that matches the detected loop type is engaged. If the detected loop type does not match any available protocol interface modules, then the interface will simply register an error, but will not engage an erroneous protocol interface module.

Although the present invention has been described with reference to preferred embodiments, workers skilled in the art will recognize that changes may be made in form and detail without departing from the spirit and scope of the invention.

What is claimed is:

1. A multi-protocol interface for coupling a field device to a general purpose computer, the interface comprising:
   a connector module wirelessly coupled to the general purpose computer;
   a plurality of process communication terminals coupled to a process communication loop;
   a first protocol interface module coupled to the plurality of process communication terminals and configured to communicate in accordance with a first protocol;
   a second protocol interface module coupled to the plurality of process communication terminals and configured to communicate in accordance with a second protocol different from the first protocol;
   loop measurement circuitry operably coupled to the process communication terminals; and
   a microprocessor coupled to the first and second protocol interface modules and coupled to the measurement circuitry, the microprocessor determining a process communication loop type based at least in part upon a plurality of loop-related measurements made by the measurement circuitry when a process communication loop is coupled to the process communication terminals; and
   wherein the multi-protocol interface is configured to provide a loop type suggestion to a user in accordance with the process communication loop type, and wherein a protocol interface module having a protocol that matches the determined process communication loop type is engaged for communication only if the user acquiesces to the suggestion.

2. The interface of claim 1, wherein the wireless coupling is in accordance with Bluetooth communication.

3. The interface of claim 1, wherein the wireless coupling is in accordance with WiFi communication.

4. The interface of claim 1, wherein at least one of the loop-related measurements includes voltage across the process communication terminals.

5. The interface of claim 4, wherein at least one of the loop-related measurements includes measurement of loop impedance.

6. The interface of claim 1, wherein the interface is intrinsically safe.

7. The interface of claim 1, wherein the microprocessor determines process communication loop type based at least in part upon a user's response to a loop type suggestion provided to the user.

* * * * *